US008132643B2

(12) United States Patent
Berker et al.

(10) Patent No.: US 8,132,643 B2
(45) Date of Patent: Mar. 13, 2012

(54) SOUND BARRIER FOR AUDIBLE ACOUSTIC FREQUENCY MANAGEMENT

(75) Inventors: Ali Berker, Saint Paul, MN (US); Richard W. Greger, Saint Paul, MN (US); Manish Jain, El Cerrito, CA (US); Marie Alsohyna ep Lesuffleur, Minneapolis, MN (US); Sanat Mohanty, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/746,967

(22) PCT Filed: Dec. 16, 2008

(86) PCT No.: PCT/US2008/086918

§ 371 (c)(1), (2), (4) Date: Jun. 9, 2010

(87) PCT Pub. No.: WO2009/085724

PCT Pub. Date: Jul. 9, 2009

(65) Prior Publication Data

US 2010/0288580 A1 Nov. 18, 2010

Related U.S. Application Data

(60) Provisional application No. 61/015,793, filed on Dec. 21, 2007.

(51) Int. Cl.
*B64F 1/26* (2006.01)

(52) U.S. Cl. ........................................ 181/210; 181/290

(58) Field of Classification Search .................. 181/210, 181/290

See application file for complete search history.

(56) References Cited

U.S. PATENT DOCUMENTS

| | | | | |
|---|---|---|---|---|
| 3,948,009 | A * | 4/1976 | Bernhard | 52/144 |
| 4,084,367 | A * | 4/1978 | Saylor et al. | 428/113 |
| 4,709,781 | A * | 12/1987 | Scherzer | 181/290 |
| 5,272,284 | A * | 12/1993 | Schmanski | 181/210 |
| 5,678,363 | A * | 10/1997 | Ogorchock et al. | 52/144 |
| 6,119,807 | A * | 9/2000 | Benson et al. | 181/208 |

(Continued)

FOREIGN PATENT DOCUMENTS

CN 1635705 7/2005

(Continued)

OTHER PUBLICATIONS http://www.engineeringtoolbox.com/density-solids-d_1265.html; Densities of Various Solids.*

(Continued)

*Primary Examiner* — Forrest M Phillips

(74) *Attorney, Agent, or Firm* — Lucy C. Weiss; Adam Bramwell

(57) ABSTRACT

A sound barrier comprises a substantially periodic array of structures disposed in a first medium having a first density, the structures being made of a second medium having a second density different from the first density, wherein one of the first and second media is a viscoelastic medium having a speed of propagation of longitudinal sound wave and a speed of propagation of transverse sound wave, the speed of propagation of longitudinal sound wave being at least about 30 times the speed of propagation of transverse sound wave, and wherein the other of the first and second media is a viscoelastic or elastic medium.

20 Claims, 9 Drawing Sheets

U.S. PATENT DOCUMENTS

| | | | | |
|---|---|---|---|---|
| 7,249,653 | B2 * | 7/2007 | Sheng et al. | 181/290 |
| 7,263,028 | B2 * | 8/2007 | Thomas et al. | 367/1 |
| 7,837,008 | B1 * | 11/2010 | Lane et al. | 181/284 |
| 2011/0100746 | A1 | 5/2011 | Berker et al. | |

FOREIGN PATENT DOCUMENTS

| | | |
|---|---|---|
| CN | 1797541 | 7/2006 |
| EP | 1 859 928 | 11/2007 |
| JP | 06032939 | 2/1994 |
| JP | 06169498 | 6/1994 |
| JP | 2006-106211 | 4/2006 |
| JP | 2006-257993 | 9/2006 |
| JP | 2006-284658 | 10/2006 |
| JP | 2006-335938 | 12/2006 |
| JP | 2007-015292 | 1/2007 |
| WO | WO 2006/021004 | 2/2006 |
| WO | WO 2006/116440 | 11/2006 |
| WO | WO 2006/119895 | 11/2006 |

OTHER PUBLICATIONS

Sigalas, M., et al., "Classical vibrational modes in phononic lattices: theory and experiment," Z. Kristallogr, vol. 220, pp. 765-809 (2005).

J.O. Vasseur, P.A. Deymier, A. Khelif, Ph. Lambin, B. Dajfari-Rouhani, A. Akjouj, L. Dobrzynski, N. Fettouhi, and J. Zemmouri, "Phononic crystal with low filling fraction and absolute acoustic band gap in the audible frequency range: A theoretical and experimental study," Phys. Rev. E 65, 056608-1-056608-6 (May 2, 2002).

Ph. Lambin, A. Khelif, J.O. Vasseur, L. Dobrzynski, and B. Djafari-Rouhani, "Stopping of acoustic waves by sonic polymer-fluid composites," Phys. Rev. E, vol. 63, pp. 066605-1- 066605-6 (May 22, 2001).

Z. Liu et al., "Locally Resonant Sonic Materials", Science Magazine, vol. 289, pp. 1734-1736 (Sep. 8, 2000).

I.E. Psarobas, "Viscoelastic response of sonic band-gap materials," Phys. Rev. B vol. 64, pp. 012303-1-012303-4 (Jun. 15, 2001).

Tanaka et al., "Band structure of acoustic waves in phononic lattices: Two-dimensional composites with large acoustic mismatch." *Physical Review B*, vol. 61, No. 11, pp. 7387-7392 (Mar. 2000).

J.O. Vasseur et al., "Experimental evidence for the existence of absolute acoustic band gaps in two-dimensional periodic composite media", Journal Physics: Condens, Matter 10, PII: S0953-8984(98)93210-6, pp. 6051-6064 (Apr. 9, 1998).

Ivansson, "Sound absorption by viscoelastic coatings with periodically distributed cavities," J. Acoust. Society of America, vol. 119, No. 6, pp. 3558-3567 (Jun. 2006).

Zhao et al., "Dynamics and sound attenuation in viscoelastic polymer containing hollow glass microspheres," J. of Applied Physics., vol. 101, No. 12, pp. 123518-1-123518-3 (Jun. 25, 2007).

Hsu et al., "Lamb waves in binary locally resonant phononic plates with two-dimensional lattices," Applied Physics Letters, vol. 90, No. 20, pp. 201904-1-201904-3, ISSN: 0003-6951 (May 15, 2007).

Goffaux et al., "Comparison of the sound attenuation efficiency of locally resonant materials and elastic band-gap structures," Physical Review B, vol. 70, 184302-1-184302-6 (Nov. 18, 2004).

Baird et al., "Wave propagation in a viscoelastic medium containing fluid-filled microspheres," J. Acoust. Soc. Am., vol. 105, No. 3, pp. 1527-1538 (Mar. 1, 1999).

Ko et al., "Application of Elastomeric material to the reduction of turbulent boundary layer pressure fluctuations (Three-Dimensional Analysis)," J. of Sound and Vibration, vol. 159, No. 3, pp. 469-481 (Dec. 22, 1992).

Merheb et al., "Elastic and viscoelastic effects in rubber/air acoustic band gap structures: A theoretical and experimental study," J. of Applied Physics. vol. 104, pp. 604913-1-604913-9 (Sep. 25, 2008).

International Search Report for PCT/US2008/086918, International Filing Date: Dec. 16, 2008.

* cited by examiner

SOUND BARRIER FOR AUDIBLE ACOUSTIC FREQUENCY MANAGEMENT

STATEMENT OF PRIORITY

This application claims the priority of U.S. Provisional Application No. 61/015,793 filed Dec. 21, 2007, the contents of which are hereby incorporated by reference.

FIELD

This invention relates to sound barriers and, in other aspects, to processes for preparing sound barriers and processes for their use in sound insulation.

BACKGROUND

Sound proofing materials and structures have important applications in the acoustic industry. Traditional materials used in the industry, such as absorbers and reflectors, are usually active over a broad range of frequencies without providing frequency selective sound control. Active noise cancellation equipment allows for frequency selective sound attenuation, but it is typically most effective in confined spaces and requires an investment in, and operation of, electronic equipment to provide power and control.

While traditional sound-absorbing materials are generally relatively light in weight and porous, traditional sound barriers tend to be relatively heavy and air-tight because the sound transmission loss from a material is generally a function of its mass and stiffness. The so-called "mass law" (applicable to many traditional acoustic barrier materials in certain frequency ranges) dictates that as the weight per unit area of a material is doubled, the transmission loss through the material increases by 6 decibels (dB). The weight per unit area can be increased by using denser materials or by increasing the thickness of the barrier. Added weight, however, can be undesirable in many applications.

Phononic crystals (that is, periodic inhomogeneous media, typically in the form of elastic/elastic or elastic/fluid constructions) have been proposed as sound barriers with acoustic passbands and band gaps. Such structures can generate acoustic band gaps in a passive, yet frequency selective way, without having to rely on viscous dissipation or resonance as the leading physical mechanism. Instead, the transmission loss is due to Bragg scattering, which results from the sound speed contrast between the two or more components of an inhomogeneous, multi-phase, spatially periodic structure.

For example, periodic arrays of copper tubes in air, periodic arrays of composite elements having high density centers covered in elastically soft material (to provide an array of localized resonant structures), and periodic arrays of water in air have been proposed to create sound barriers with frequency-selective characteristics. These approaches have typically suffered, however, from drawbacks such as the production of narrow band gaps, the production of band gaps at frequencies too high (for example, ultrasound frequencies of 20 kHz or higher) for audio applications, and/or the need for bulky and/or heavy physical structures (for example, metal pipes having diameters of several centimeters arranged in arrays having external dimensions of decimeters or meters).

SUMMARY

Thus, we recognize that there is a need for sound barriers that can be at least partially effective at audible acoustic frequencies (reducing or, preferably, eliminating sound transmission) while being relatively small in external dimensions and/or relatively light in weight. Preferably, the sound barriers can be at least partially effective over a relatively broad range of audible frequencies and/or can be relatively simply and cost-effectively prepared.

Briefly, in one aspect, this invention provides such a sound barrier, which comprises a substantially periodic array of structures disposed in a first medium having a first density, the structures being made of a second medium having a second density different from the first density, wherein one of the first and second media is a viscoelastic medium having a speed of propagation of longitudinal sound wave and a speed of propagation of transverse sound wave, the speed of propagation of longitudinal sound wave being at least about 30 times the speed of propagation of transverse sound wave, and wherein the other of the first and second media is a viscoelastic or elastic medium. Preferably, the substantially periodic array of structures is a one-dimensional array in the form of a multilayer structure comprising alternating layers of the first and second media.

It has been discovered that, by selecting viscoelastic materials having certain characteristics and combining them with viscoelastic or elastic materials to form spatially periodic arrays, phononic crystal structure band gaps or at least significant transmission losses (for example, greater than 20 decibels (dB)) can be obtained in at least portions of the audible range (that is, the range of 20 hertz (Hz) to 20 kilohertz (kHz)). Such structures can be relatively light in weight and relatively small (for example, having external dimensions on the order of a few centimeters or less). By controlling such design parameters as the selection of materials, the type of lattice structure, the spacing of the different materials, and so forth, the frequency of the band gap, the number of gaps, and their widths can be tuned, or, at a minimum, the transmission loss levels can be adjusted as a function of frequency.

The phononic crystal structures can generate acoustic band gaps in a passive, yet frequency selective way. Unlike the most common sound absorbers used in the acoustics industry, phononic crystals control sound in transmission mode. Within the range of frequencies of the band gap, there can be essentially no transmission of an incident sound wave through the structure. The band gap is not always absolute (that is, no sound transmission), but the sound transmission loss can often be on the order of 20 decibels (dB) or more. In the acoustic industry, attenuations on the order of 3 dB are considered significant, so 20+dB is a very significant loss in transmission, approaching 100 percent reduction in acoustic power.

Phononic crystal structures can be placed between a sound source and a receiver to allow only select frequencies to pass through the structure. The receiver thus hears filtered sound, with undesirable frequencies being blocked. By properly configuring the phononic crystal structure, the transmitted frequencies can be focused at the receiver, or the undesirable frequencies can be reflected back to the sound source (much like a frequency selective mirror). Unlike current acoustic materials, the phononic crystal structures can be used to actually manage sound waves, rather than simply to attenuate or reflect them.

Thus, in at least some embodiments, the sound barrier of the invention can meet the above-cited need for sound barriers that can be at least partially effective at audible acoustic frequencies while being relatively small in external dimensions and/or relatively light in weight. The sound barrier of the invention can be used to provide sound insulation in a variety of different environments including buildings (for example, homes, offices, hospitals, and so forth), highway sound barriers, and the like.

In another aspect, this invention also provides a process for preparing a sound barrier. The process comprises (a) providing a first medium having a first density; (b) providing a second medium having a second density that is different from the first density; and (c) forming a substantially periodic array of structures disposed in the first medium, the structures being made of the second medium; wherein one of the first and second media is a viscoelastic medium having a speed of propagation of longitudinal sound wave and a speed of propagation of transverse sound wave, the speed of propagation of longitudinal sound wave being at least about 30 times the speed of propagation of transverse sound wave, and wherein the other of the first and second media is a viscoelastic or elastic medium.

In yet another aspect, this invention further provides a sound insulation process. The process comprises (a) providing a sound barrier comprising a substantially periodic array of structures disposed in a first medium having a first density, the structures being made of a second medium having a second density different from the first density, wherein one of the first and second media is a viscoelastic medium having a speed of propagation of longitudinal sound wave and a speed of propagation of transverse sound wave, the speed of propagation of longitudinal sound wave being at least about 30 times the speed of propagation of transverse sound wave, and wherein the other of the first and second media is a viscoelastic or elastic medium; and (b) interposing the sound barrier between an acoustic source (preferably, a source of audible acoustic frequencies) and an acoustic receiver (preferably, a receiver of audible acoustic frequencies).

BRIEF DESCRIPTION OF DRAWING

These and other features, aspects, and advantages of the present invention will become better understood with regard to the following description, appended claims, and accompanying drawing, wherein:

DETAILED DESCRIPTION

Materials

Figure 1:
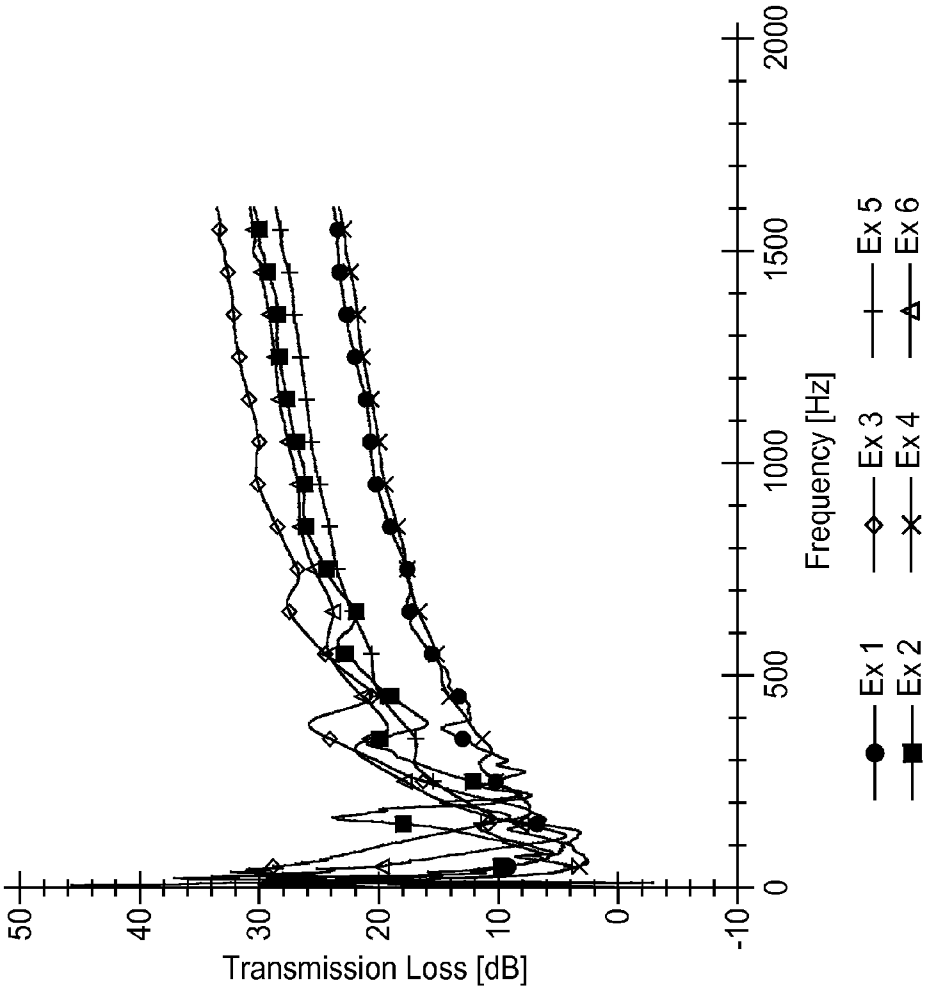
FIG. 1 is a plot of transmission loss (in dB) versus frequency (in Hz) for the embodiments of the sound barrier of the invention described in Examples 1-6.
Figure 2:
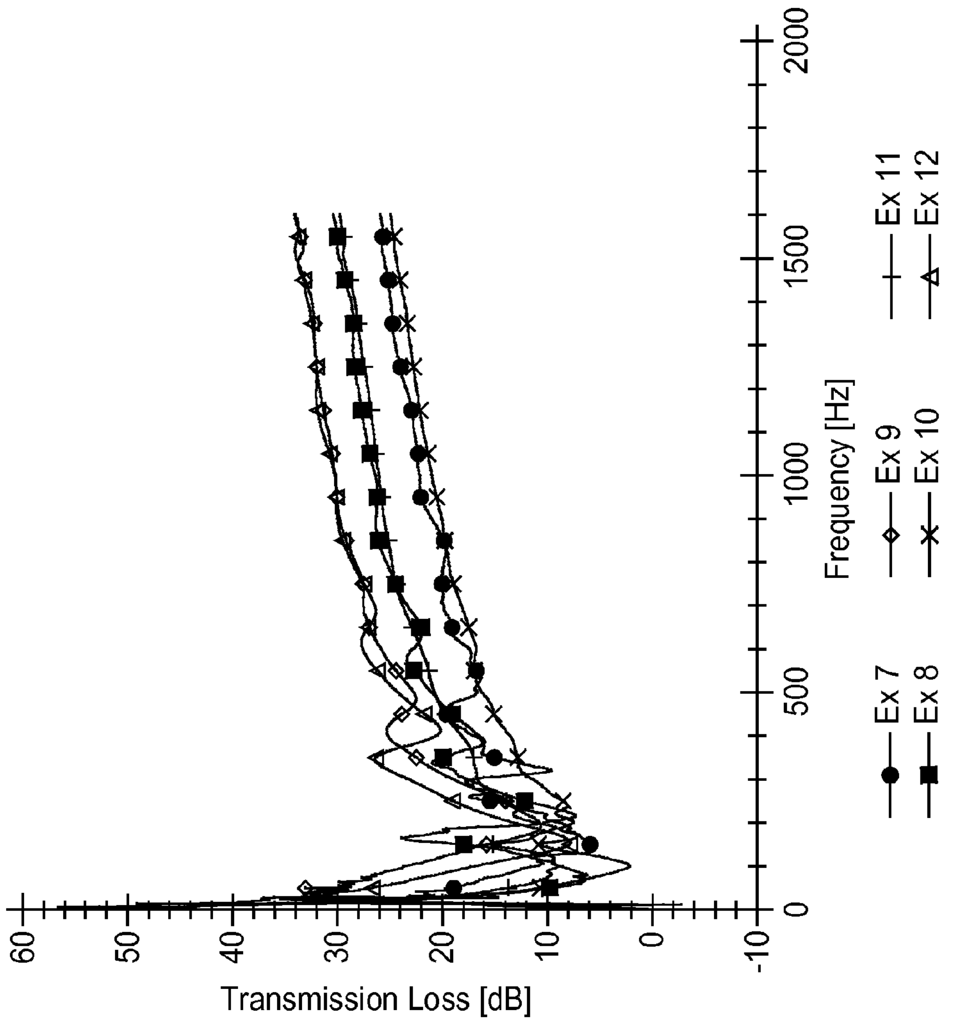
FIG. 2 is a plot of transmission loss (in dB) versus frequency (in Hz) for the embodiments of the sound barrier of the invention described in Examples 7-12.
Figure 3:
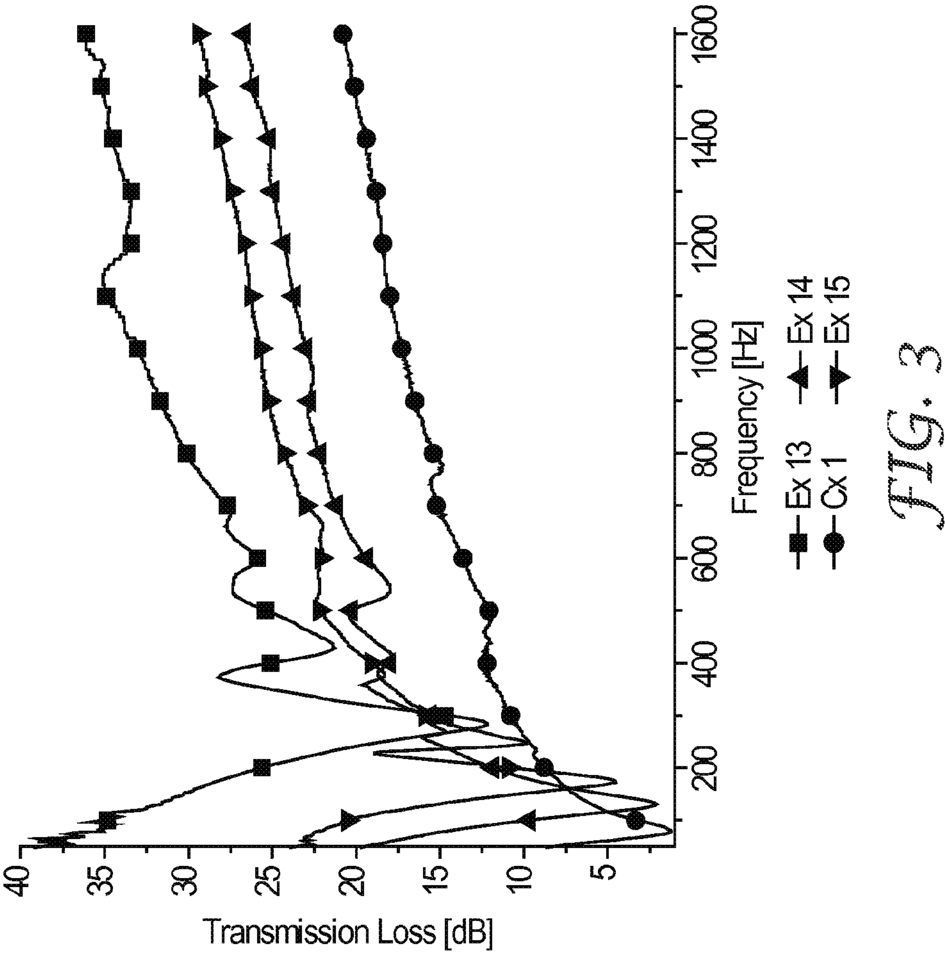
FIG. 3 is a plot of transmission loss (in dB) versus frequency (in Hz) for the embodiments of the sound barrier of the invention described in Examples 13-15 and Comparative Example 1.
Figure 4:
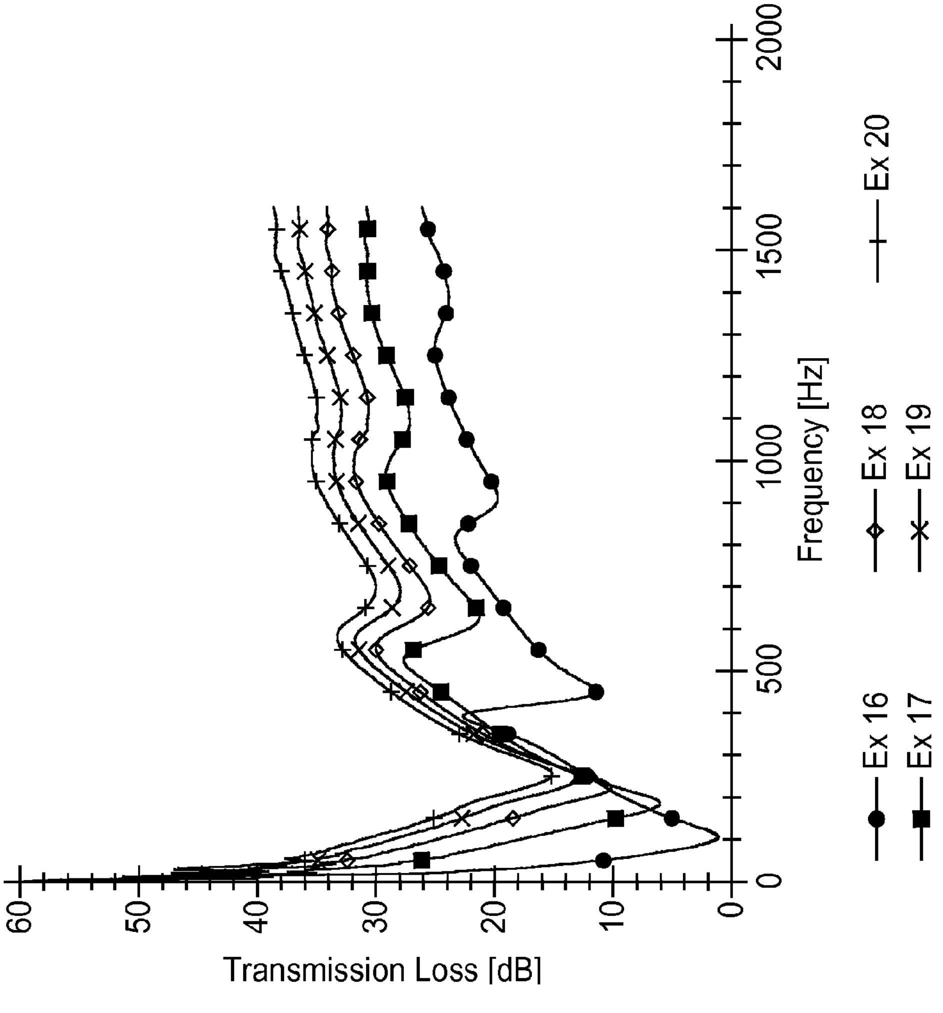
FIG. 4 is a plot of transmission loss (in dB) versus frequency (in Hz) for the embodiments of the sound barrier of the invention described in Examples 16-20.
Figure 5:
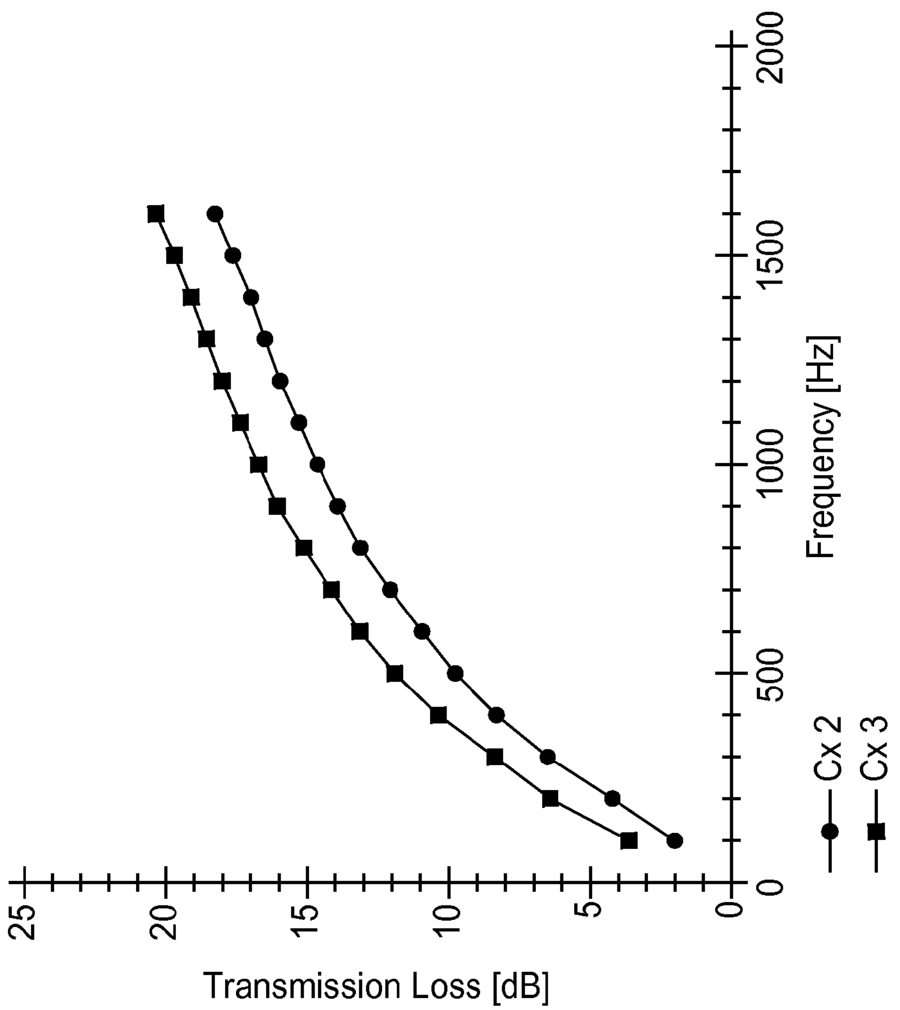
FIG. 5 is a plot of transmission loss (in dB) versus frequency (in Hz) for the embodiments of the sound barrier of the invention described in Comparative Examples 2 and 3.
Figure 6:
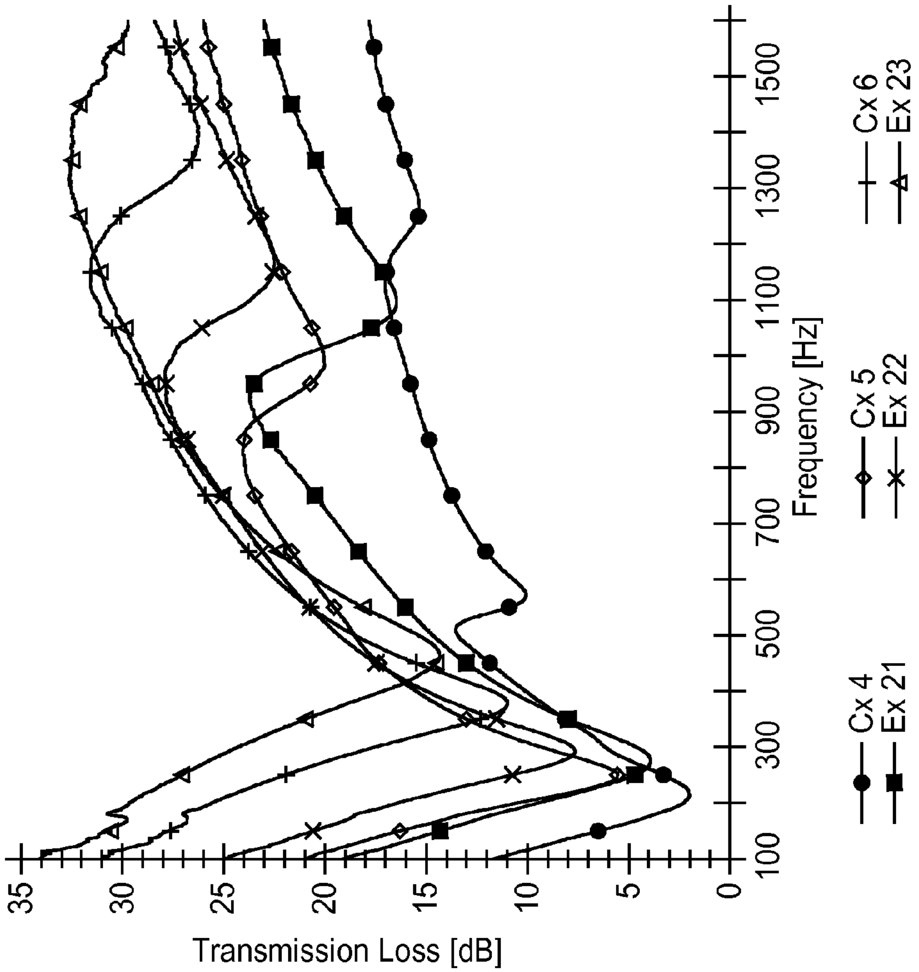
FIG. 6 is a plot of transmission loss (in dB) versus frequency (in Hz) for the embodiments of the sound barrier of the invention described in Examples 21-23 and Comparative Examples 4-6.
Figure 7:
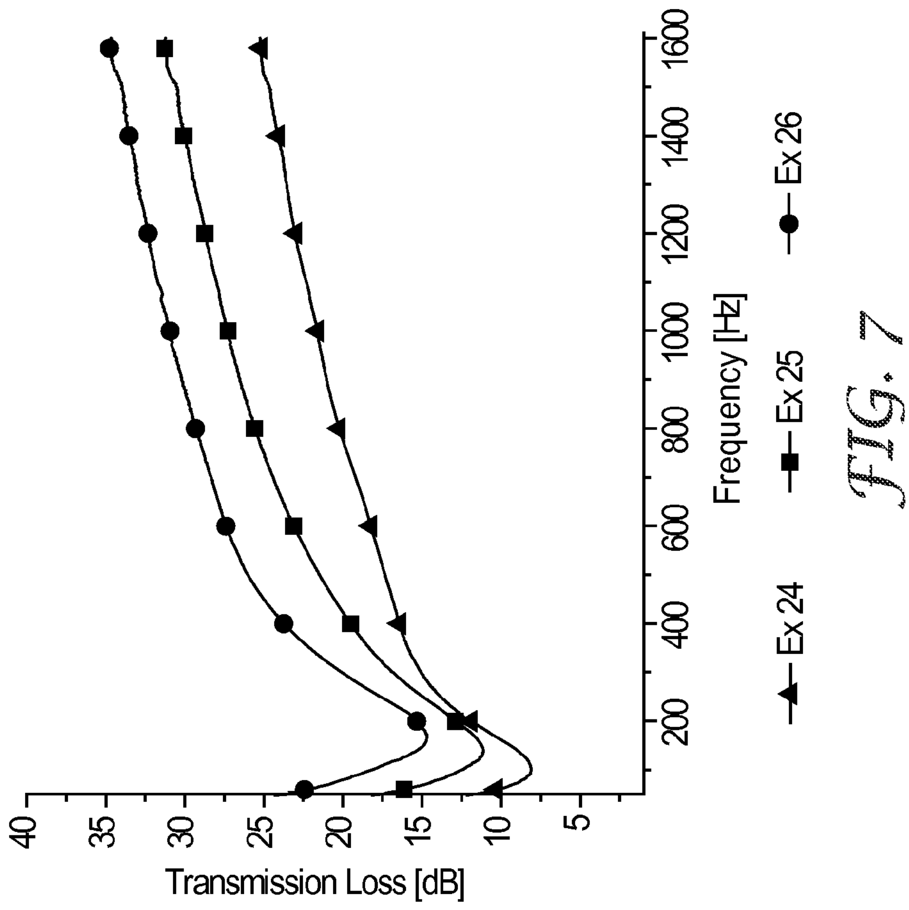
FIG. 7 is a plot of transmission loss (in dB) versus frequency (in Hz) for the embodiments of the sound barrier of the invention described in Examples 24-26.

Materials that are suitable for use as the above-referenced viscoelastic components of the sound barrier of the invention include those viscoelastic solids and liquids having (preferably, at least in the audible range of acoustic frequencies) a speed of propagation of longitudinal sound wave that is at least about 30 times (preferably, at least about 50 times; more preferably, at least about 75 times; most preferably, at least about 100 times) its speed of propagation of transverse sound wave. Useful viscoelastic solids and liquids include those having a steady shear plateau modulus ($G^{\circ}_{N}$) of less than or equal to about $5\times10^{6}$ Pascals (Pa) at ambient temperatures (for example, about 20° C.), the steady shear plateau modulus preferably extending from about 30 Kelvin degrees to about 100 Kelvin degrees above the glass transition temperature ($T_g$) of the material. Preferably, at least one of the viscoelastic materials in the sound barrier has a steady shear plateau modulus of less than or equal to about $1\times10^{6}$ Pa (more preferably, less than or equal to about $1\times10^{5}$ Pa) at ambient temperatures (for example, about 20° C.).

Examples of such viscoelastic materials include rubbery polymer compositions (for example, comprising lightly-crosslinked or semi-crystalline polymers) in various forms including elastomers (including, for example, thermoplastic elastomers), elastoviscous liquids, and the like, and combinations thereof (preferably, for at least some applications, elastomers and combinations thereof). Useful elastomers include both homopolymers and copolymers (including block, graft, and random copolymers), both inorganic and organic polymers and combinations thereof, and polymers that are linear or branched, and/or that are in the form of interpenetrating or semi-interpenetrating networks or other complex forms (for example, star polymers). Useful elastoviscous liquids include polymer melts, solutions, and gels (including hydrogels).

Preferred viscoelastic solids include silicone rubbers (preferably, having a durometer hardness of about 20A to about 70A; more preferably, about 30A to about 50A), (meth)acrylate (acrylate and/or methacrylate) polymers (preferably, copolymers of isooctylacrylate (IOA) and acrylic acid (AA)), block copolymers (preferably, comprising styrene, ethylene, and butylene), cellulosic polymers (preferably, cork), blends of organic polymer (preferably, a polyurethane) and polydiorganosiloxane polyamide block copolymer (preferably, a silicone polyoxamide block copolymer), neoprene, and combinations thereof. Preferred viscoelastic liquids include mineral oil-modified block copolymers, hydrogels, and combinations thereof.

Such viscoelastic solids and liquids can be prepared by known methods. Many are commercially available.

Materials that are suitable for use as the above-referenced elastic component of the sound barrier of the invention include essentially all elastic materials. Preferred elastic materials, however, include those having a longitudinal speed of sound that is at least about 2000 meters per second (m/s). The elastic material preferably has a density less than that of lead.

Useful classes of elastic solids include metals (and alloys thereof), glassy polymers (for example, cured epoxy resin), and the like, and combinations thereof. Preferred classes of elastic solids include metals, metal alloys, glassy polymers, and combinations thereof (more preferably, copper, aluminum, epoxy resin, copper alloys, aluminum alloys, and combinations thereof even more preferably, copper, aluminum, copper alloys, aluminum alloys, and combinations thereof; yet more preferably, aluminum, aluminum alloys, and combinations thereof; most preferably, aluminum).

Such elastic materials can be prepared or obtained by known methods. Many are commercially available.

If desired, the sound barrier of the invention can optionally comprise other component materials. For example, the sound barrier can include more than one viscoelastic material (including one or more viscoelastic materials that do not have a speed of propagation of longitudinal sound wave that is at least about 30 times its speed of propagation of transverse sound wave, provided that at least one viscoelastic material in the sound barrier meets this criterion) and/or more than one of the above-described elastic materials. The sound barrier can optionally include one or more inviscid fluids.

Preparation of Phononic Crystal Structure

The sound barrier of the invention comprises a substantially periodic (one-, two-, or three-dimensional) array of structures disposed in a first medium having a first density, the structures being made of a second medium having a second density different from the first density, as described above. Such an array can be formed by using either an above-described viscoelastic material or an above-described elastic material (or, as an alternative to an elastic material, a second, different viscoelastic material) as the first medium and the other of the two as the second medium.

The resulting structure or phononic crystal can be a macroscopic construction (for example, having a size scale on the order of centimeters or millimeters or less). If desired, the phononic crystal can take the form of a spatially periodic lattice with uniformly-sized and uniformly-shaped inclusions at its lattice sites, surrounded by a material that forms a matrix between the inclusions. Design parameters for such structures include the type of lattice (for example, square, triangular, and so forth), the spacing between the lattice sites (the lattice constant), the make-up and shape of the unit cell (for example, the fractional area of the unit cell that is occupied by the inclusions—also known as f, the so-called "fill factor"), the physical properties of the inclusion and matrix materials (for example, density, Poisson ratio, modulus, and so forth), the shape of the inclusion (for example, rod, sphere, hollow rod, square pillar, and so forth), and the like. By controlling such design parameters, the frequency of the resulting band gap, the number of gaps, and their widths can be tuned, or, at a minimum, the level of transmission loss can be adjusted as a function of frequency.

Preferably, the substantially periodic array of structures is a one-dimensional array in the form of a multi-layer structure comprising alternating layers of the first and second media (and, if desired, further comprising one or more of the above-described optional components in the form of one or more layers; for example, an "ABCD" structure, an "ACDB" structure, an "ACBD" structure, and so forth can be formed from the first (A) and second (B) media and two additional components C and D). The total number of layers of the multi-layer structure can vary over a wide range, depending upon the particular materials that are utilized, the layer thicknesses, and the requirements of a particular acoustic application.

For example, the total number of layers of the multi-layer structure can range from as few as two layers to as high as hundreds of layers or more. Layer thicknesses can also vary widely (depending upon, for example, the desired periodicity) but are preferably on the order of centimeters or less (more preferably, on the order of millimeters or less; most preferably, less than or equal to about 10 mm). Such layer thicknesses and numbers of layers can provide phononic crystal structures having dimensions on the order of centimeters or less (preferably, less than or equal to about 100 mm; more preferably, less than or equal to about 50 mm; even more preferably, less than or equal to about 10 mm; most preferably, less than or equal to about 5 mm). If desired, the layers can be cleaned (for example, using surfactant compositions or isopropanol) prior to assembly of the structure, and one or more bonding agents (for example, adhesives or mechanical fasteners) can optionally be utilized (provided that there is no significant interference with the desired acoustics).

A preferred embodiment of the multi-layer structure comprises from about 3 to about 10 (more preferably, from about 3 to about 5) alternating layers of viscoelastic material (preferably, silicone rubber, acrylate polymer, or a combination thereof) having a layer thickness of about 0.75 mm to about 1.25 mm and an elastic material (preferably, aluminum, epoxy resin, aluminum alloy, or a combination thereof) having a layer thickness of about 0.025 mm to about 1 mm. This can provide a phononic crystal structure having preferred dimensions on the order of about 1 mm to about 10 mm (more preferably, about 2 mm to about 4 mm; most preferably, about 2 mm to about 3 mm).

Sound Barrier and Its Use

The sound barrier of the invention can be used in a sound insulation process comprising interposing or placing the sound barrier between an acoustic source (preferably, a source of audible acoustic frequencies) and an acoustic receiver (preferably, a receiver of audible acoustic frequencies). Useful acoustic sources include traffic noise, industrial noise, conversation, music, and the like (preferably, noises or other sounds having an audible component; more preferably, noises or other sounds having a frequency component in the range of about 500 Hz to about 1500 Hz). The acoustic receiver can be, for example, a human ear, any of various recording devices, and the like (preferably, the human ear). If desired, the sound barrier can be used as an acoustic absorber (for example, by positioning the sound barrier relative to a substrate such that it can function as a Helmholtz resonator-type absorber).

The sound barrier of the invention can be used to achieve transmission loss across a relatively large portion of the audible range (with preferred embodiments providing a transmission loss that is greater than or equal to about 20 dB across the range of about 800 Hz to about 1500 Hz; with more preferred embodiments providing a transmission loss that is greater than or equal to about 20 dB across the range of about 500 Hz to about 1500 Hz; with even more preferred embodiments providing a transmission loss that is greater than or equal to about 20 dB across the range of about 250 Hz to about 1500 Hz; and with most preferred embodiments providing substantially total transmission loss across at least a portion of the range of about 500 Hz to about 1500 Hz). Such transmission losses can be achieved while maintaining phononic crystal structure dimensions on the order of centimeters or less (preferably, less than or equal to about 20 cm; more preferably, on the order of millimeters or less; most preferably, on the order of about 1 to about 3 mm).

In addition to one or more of the above-described phononic crystal structures, the sound barrier of the invention can optionally further comprise one or more conventional or hereafter-developed sound insulators (for example, conventional absorbers, barriers, and the like). If desired, such conventional sound insulators can be layered, for example, to broaden the frequency effectiveness range of the sound barrier.

EXAMPLES

Objects and advantages of this invention are further illustrated by the following examples, but the particular materials and amounts thereof recited in these examples, as well as other conditions and details, should not be construed to unduly limit this invention. All parts, percentages, ratios, and the like in the examples are by weight, unless noted otherwise. Solvents and other reagents were obtained from Sigma-Aldrich Chemical Company, St. Louis, Mo. unless otherwise noted.

Test Methods

Transmission Loss Measurements

Transmission loss measurements were carried out by using a Brüel & Kjær Impedance Tube System Type 4206 (100 mm tube, Brüel & Kjær Sound & Vibration Measurement A/S, Denmark). A four-microphone transfer-function test method was used for measurements of transmission loss in the frequency range of 50 Hz to 1.6 kHz.

In brief, the tube system was composed of source, holder, and receiving tubes of 100 mm internal diameter. Each test sample was set up with two rubber o-rings inside the holder tube located between the source and receiving tubes. A loudspeaker (4 ohms (Ω) impedance, 80 mm diameter) mounted at the end of the source tube was used as a generator of sound plane waves. Four 0.64 cm (¼ inch) condenser microphones of Type 4187 were used to measure the sound pressure levels on both sides of the test sample (two in the source tube and two in the receiving tube). The two microphones in the source tube were used to determine incoming and reflected plane waves. The two other microphones located in the receiving tube were used to determine absorbed and transmitted portions.

By measuring sound pressure at the four microphone locations and calculating the complex transfer function using a four-channel digital frequency analyzer according to the procedure described by Olivieri, O., Bolton, J. S., and Yoo, T. in "*Measurement of Transmission Loss of Materials Using a Standing Wave Tube*", INTER-NOISE 2006, 3-6 Dec. 2006, Honolulu, Hi., USA, the transmission loss of the test sample was determined. PULSE version 11 data acquisition and analysis software (Brüel & Kjær) was utilized.

For each structure, two different test samples were prepared. All test samples were cut with a 99.54 mm diameter precision die. Transmission loss measurements were repeated three times for each test sample. The resulting transmission loss for each structure was calculated as the arithmetical average of six measurements from the two different test samples.

Measurement of Sound Absorption Coefficient

Measurements of absorption coefficient were carried out by using a Brüel & Kjær Impedance Tube System Type 4206 (100 mm tube, Brüel & Kjær Sound & Vibration Measurement A/S, Denmark). A two-microphone transfer-function method was applied to perform these measurements in the 50 Hz-1.6 kHz frequency range according to the standard procedure described in ASTM E 1050.

The tube system was composed of source and holder tubes of 100 mm internal diameter. As a generator of broadband, stationary random sound waves, a loudspeaker (4 ohms (Ω) impedance, 80 mm diameter) was mounted at the end of the source tube. Each test sample was placed at the entrance of the holder tube. The test sample was supported with pieces of adhesive tape in four places (9, 12, 3, and 6 o'clock positions). The backing termination plate of the receiving tube was placed at 5 different positions to generate 4 different measurements with 0, 1, 2, and 3 cm air gaps between the test sample and the face of the backing plate. Two 0.64 cm (¼ inch) condenser microphones of Type 4187 were used to measure sound pressure levels at two fixed locations in the source tube.

The sound plane waves generated by the loudspeaker propagated in the source tube before reaching the test sample and underwent reflection at the face of the test sample, absorption in the test sample, and transmission through the test sample. The transmitted wave was reflected at the back plate and went back into the test sample. Due to the superposition of incident and reflected waves inside the tube, a standing-wave interference pattern was generated.

By measuring the sound pressure level at two fixed locations and calculating the complex transfer function using a two-channel digital frequency analyzer, the sound absorption coefficient was determined. PULSE version 10 data acquisition and analysis software (Brüel & Kjær) was utilized.

Rheological Measurements

Rheological properties (for example, steady shear plateau modulus) were determined by carrying out linear, isothermal frequency sweep Dynamic Mechanical Analysis (DMA) tests in extensional mode on a test sample of material in a commercial ARES dynamic rheometer (available through TA Instruments of New Castle, Del.). The resulting data were then shifted using the Time-Temperature Superposition Principle to yield dynamic master curves at a selected reference temperature (taken as room temperature of 22.7° C.). The horizontal shift factors that were used for the shifting of the dynamic master curves were checked and found to obey the Williams-Landel-Ferry (WLF) form. The resulting dynamic master curves were finally converted to steady linear extensional modulus master curves at room temperature (22.7° C.) by means of the Ninomiya-Ferry (NF) procedure. The value of the rubbery tensile modulus plateau was determined from the steady linear extensional modulus master curve, and the steady shear plateau modulus of the material was taken to be one-third of the rubbery extensional modulus plateau value. (See, for example, the discussion of rheological data analysis techniques by John D. Ferry in *Viscoelastic Properties of Polymers*, $2^{nd}$ Edition, John Wiley & Sons, Inc., New York (1980).)

Materials

Preparation of Silicone Polyoxamide Block Copolymer

A sample of polydimethylsiloxane (PDMS) diamine (830.00 grams; average molecular weight (MW) of about 14,000 grams per mole; prepared essentially as described in U.S. Pat. No. 5,214,119) was placed in a 2-liter, 3-neck resin reaction flask equipped with a mechanical stirrer, heating mantle, nitrogen inlet tube (with stopcock), and an outlet tube. The flask was purged with nitrogen for 15 minutes and then, with vigorous stirring, diethyl oxalate (33.56 grams) was added dropwise. The resulting reaction mixture was stirred for approximately one hour at room temperature and then for 75 minutes at 80° C. The reaction flask was fitted with a distillation adaptor and receiver. The reaction mixture was heated under vacuum (133 Pascals, 1 Torr) for 2 hours at 120° C. and then 30 minutes at 130° C., until no further distillate was able to be collected. The reaction mixture was cooled to room temperature. Gas chromatographic analysis of the resulting clear, mobile liquid product showed that no detectable level of diethyl oxalate remained. The ester equivalent weight of the product was determined using $^{1}H$ nuclear magnetic resonance (NMR) spectroscopy (equivalent weight equal to 7,916 grams/equivalent) and by titration (equivalent weight equal to 8,272 grams/equivalent).

Into a 20° C. 10-gallon (37.85-Liter) stainless steel reaction vessel, 18158.4 grams of ethyl oxalylamidopropyl terminated polydimethylsiloxane (titrated MW=14,890; prepared essentially as described above, with the volumes adjusted accordingly) was placed. The vessel was subjected to agitation (75 revolutions per minute (rpm)), and purged with nitrogen flow and vacuum for 15 minutes. The vessel was then heated to 80° C. over the course of 25 minutes. Ethylene diamine (73.29 grams, GFS Chemicals) was vacuum charged into the vessel, followed by 73.29 grams of toluene (also vacuum charged). The vessel was then pressurized to 1 psig (6894 Pa) and heated to a temperature of 120° C. After 30 minutes, the vessel was heated to 150° C. When a temperature of 150° C. was reached, the vessel was vented over the course of 5 minutes. The vessel was subjected to vacuum (approximately 65 mm Hg, 8665 Pa) for 40 minutes to remove the ethanol and toluene. The vessel was then pressured to 2 psig (13789 Pa), and the resulting viscous molten polymer was then drained into TEFLON fluoropolymer-coated trays and allowed to cool. The resulting cooled silicone polyoxamide product, polydiorganosiloxane polyoxamide block copolymer, was then ground into fine pellets.

Preparation of Blend of Silicone Polyoxamide Block Copolymer and Polyurethane 2.5 grams of the above-prepared silicone polyoxamide block copolymer and 7.5 grams of MORTHANE PE44-203 thermoplastic elastomeric polyurethane (available from Morton International, Inc., Chicago, Ill.) were combined to form a ten-gram (10-gram) batch. The batch was dry blended by hand and fed into a DSM micro 15 extruder. The batch was pushed into the extruder using a plunger. The batch was mixed 2-4 minutes at 150 revolutions per minute (rpm). The resulting melted mixture came out the end of the extruder into a small heated cylinder for molding into bars or onto a heated piece of aluminum for creating pressed sheets. The cylinder was placed in front of a die, and a plunger forced the mixture into the die. The mixture on the sheet of aluminum had another sheet of aluminum placed on top and was put into a Carver hydraulic press. The press was set at the same temperature used for extrusion of the batch (196° C.). The mixture was flattened as the platens of the press came together to provide a desired thickness of 0.65 mm.

Silicone Rubber No. 1; Item number 86915K24 available from McMaster-Carr Inc., Elmhurst, Ill., durometer hardness 40A, thickness 0.8 mm, with adhesive backing, steady shear plateau modulus of $4.3\times10^5$ Pa at room temperature of 22.7° C. determined essentially as described above Silicone Rubber No. 2; Item number 8977K312 available from McMaster-Carr, Elmhurst, Ill., durometer hardness 40A, thickness 0.8 mm, with adhesive backing Polyurethane: Morthane™ thermoplastic elastomeric polyurethane, Item number PE44-203 available from Morton International Inc., Chicago, Ill.

Block Copolymer: Kraton™ G1657 linear styrene-(ethylene-butylene) block copolymer, available from Shell Chemical Co., Houston, Tex., pressed into a sheet of thickness 1.2 mm Silicone Polyoxamide Block Copolymer: the polydiorganosiloxane polyamide block copolymer prepared as described above Blend of Polyurethane and Silicone Polyoxamide: the melt blend of 75 weight percent polyurethane and 25 weight percent silicone polyoxamide block copolymer prepared as described above and pressed into sheet of thickness 0.65 mm Acrylate Copolymer: 4 layers of acrylic pressure sensitive transfer adhesive (available from 3M Company, St. Paul, Minn. under the trade designation 3M™ VHB™ Adhesive Transfer Tape F9473PC), 0.25 mm (10 mils) layer thickness, total thickness of 1.0 mm Cork: Cork sheet, catalog number 23420-708, available from VWR International, Inc., West Chester, Pa., thickness 3.0 mm Aluminum No. 1: Aluminum foil, thickness 0.076 mm, item number 9536K32 from McMaster-Carr Inc., Elmhurst, Ill.

Aluminum No. 2: Aluminum foil, thickness 0.03 mm, sold commercially under the brand name of Reynolds Wrap™, available from Alcoa Corp., Pittsburgh, Pa.

Copper No. 1: Copper alloy 110 foil, thickness 0.076 mm, item number 9709K55 from McMaster-Carr Inc., Elmhurst, Ill.

Copper No. 2: Copper alloy 110 foil, thickness 0.025 mm, item number 9709K53 from McMaster-Carr Inc., Elmhurst, Ill.

Copper No. 3: Copper alloy 110 foil, thickness 0.254 mm, item number 9709K66 from McMaster-Carr Inc., Elmhurst, Ill.

Examples 1-26 and Comparative Examples 1-6

Various multi-layer structures were constructed by assembling layers of a variety of materials (designated as Materials A and B) in a variety of different configurations having varying numbers of layers and varying layer thicknesses, as shown in Table 1 below. Six single-layer structures were also prepared as comparative structures. The transmission loss properties of the resulting structures were tested essentially according to the above-described procedure, and the results are shown in FIGS. 1-7.

TABLE 1

| Example Number | Material A | Material B | Material A Thickness (mm) | Material B Thickness (mm) | Structure |
|---|---|---|---|---|---|
| 1 | Silicone Rubber No. 1 | Aluminum No. 1 | 0.8 | 0.08 | AB |
| 2 | Silicone Rubber No. 1 | Aluminum No. 1 | 0.8 | 0.08 | ABA |
| 3 | Silicone Rubber No. 1 | Aluminum No. 1 | 0.8 | 0.08 | ABABA |
| 4 | Silicone Rubber No. 1 | Aluminum No. 2 | 0.8 | 0.03 | AB |
| 5 | Silicone Rubber No. 1 | Aluminum No. 2 | 0.8 | 0.03 | ABA |

TABLE 1-continued

| Example Number | Material A | Material B | Material A Thickness (mm) | Material B Thickness (mm) | Structure |
|---|---|---|---|---|---|
| 6 | Silicone Rubber No. 1 | Aluminum No. 2 | 0.8 | 0.03 | ABABA |
| 7 | Silicone Rubber No. 1 | Copper No. 1 | 0.8 | 0.08 | AB |
| 8 | Silicone Rubber No. 1 | Copper No. 1 | 0.8 | 0.08 | ABA |
| 9 | Silicone Rubber No. 1 | Copper No. 1 | 0.8 | 0.08 | ABABA |
| 10 | Silicone Rubber No. 1 | Copper No. 2 | 0.8 | 0.03 | AB |
| 11 | Silicone Rubber No. 1 | Copper No. 2 | 0.8 | 0.03 | ABA |
| 12 | Silicone Rubber No. 1 | Copper No. 2 | 0.8 | 0.03 | ABABA |
| 13 | Silicone Rubber No. 1 | Copper No. 3 | 0.8 | 0.25 | ABABA |
| C-1 | — | Copper No. 3 | — | 0.25 | B |
| 14 | Silicone Rubber No. 1 | Copper No. 3 | 0.8 | 0.25 | AB |
| 15 | Silicone Rubber No. 1 | Copper No. 3 | 0.8 | 0.25 | ABA |
| 16 | Silicone Rubber No. 2 | Aluminum No. 2 | 0.8 | 0.03 | AB |
| 17 | Silicone Rubber No. 2 | Aluminum No. 2 | 0.8 | 0.03 | ABAB |
| 18 | Silicone Rubber No. 2 | Aluminum No. 2 | 0.8 | 0.03 | ABABAB |
| 19 | Silicone Rubber No. 2 | Aluminum No. 2 | 0.8 | 0.03 | ABABABAB |
| 20 | Silicone Rubber No. 2 | Aluminum No. 2 | 0.8 | 0.03 | ABABABABAB |
| C-2 | Blend of Polyurethane and Silicone Polyoxamide | — | 0.65 | — | A |
| C-3 | Block Copolymer | — | 1.2 | — | A |
| C-4 | Cork | — | 3.0 | — | A |
| 21 | Cork | Aluminum No. 2 | 3.0 | 0.03 | AB |
| C-5 | Cork | — | 3.0 | — | AA |
| 22 | Cork | Aluminum No. 2 | 3.0 | 0.03 | ABA |
| C-6 | Cork | — | 3.0 | — | AAA |
| 23 | Cork | Aluminum No. 2 | 3.0 | 0.03 | ABABA |
| 24 | Acrylate Copolymer | Aluminum No. 2 | 1.0 | 0.03 | AB |
| 25 | Acrylate Copolymer | Aluminum No. 2 | 1.0 | 0.03 | ABA |
| 26 | Acrylate Copolymer | Aluminum No. 2 | 1.0 | 0.03 | ABABA |

Examples 27-30

Use as Acoustic Absorber

Figure 8:
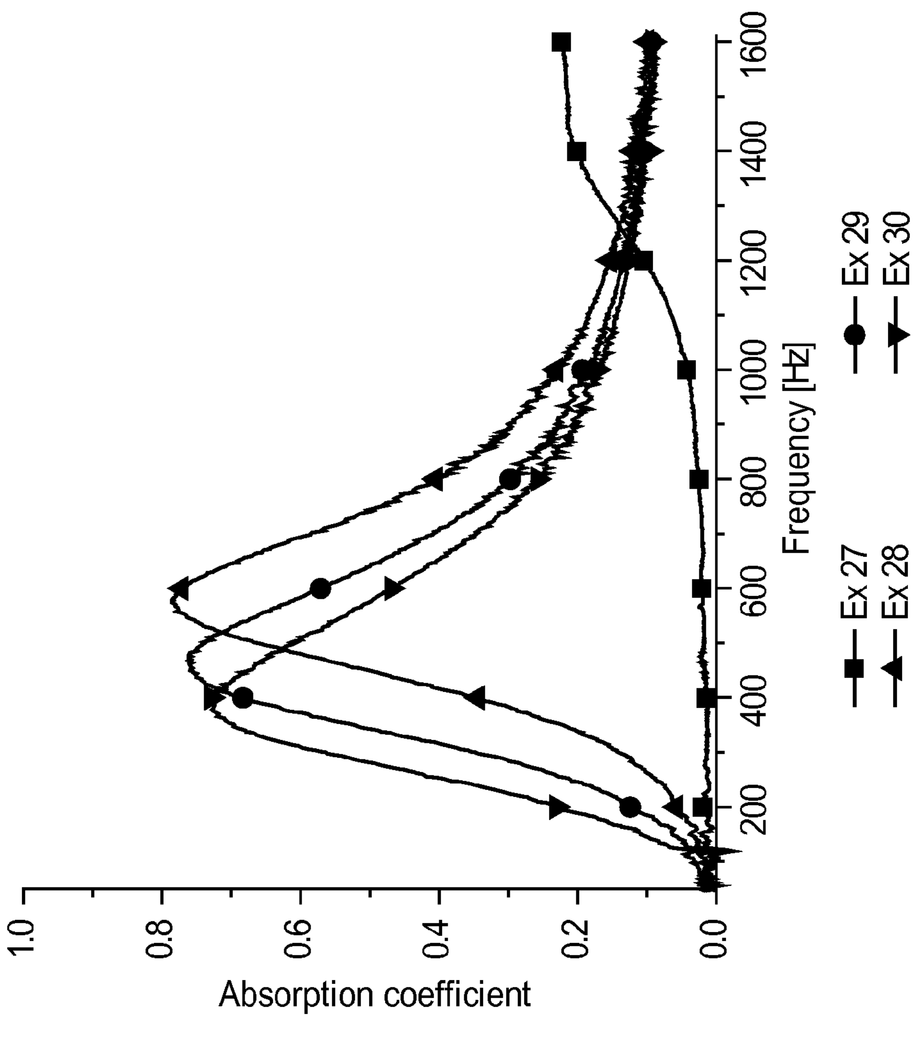
FIG. 8 is a plot of absorbance coefficient versus frequency (in Hz) for the embodiments of the sound barrier of the invention described in Examples 27-30.
Figure 9:
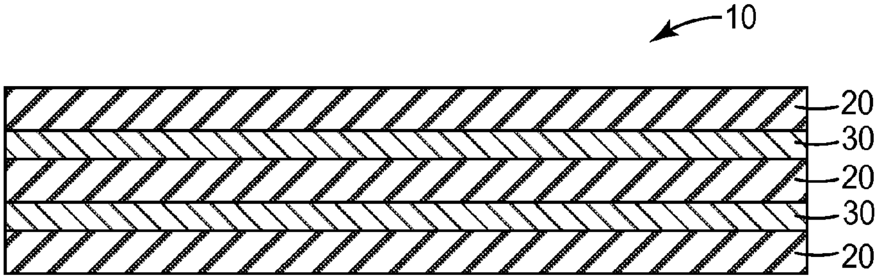
FIG. 9 shows a side sectional view of an embodiment of the sound barrier of the invention, which comprises a one-dimensional substantially periodic array 10 comprising alternating viscoelastic layers 20 and elastic layers 30. This figure, which is idealized, is not drawn to scale and is intended to be merely illustrative and nonlimiting.

A three-layer structure (total thickness 1.63 mm) was constructed by assembling layers of the materials (designated as Materials A and B) shown in Table 2 below. The absorption coefficient of the resulting ABA structure was determined essentially according to the above-described procedure (with a varying air gap between the structure and the back (reflecting) plate of the tube system (in absorbance mode), as shown in Table 2), and the results are shown in FIG. 8.

TABLE 2

| Example Number | Material A | Material B | Material A Thickness (mm) | Material B Thickness (mm) | Multi-layer Structure | Size of Air Gap (cm) |
|---|---|---|---|---|---|---|
| 27 | Silicone Rubber No. 1 | Aluminum No. 2 | 0.8 | 0.03 | ABA | 0 |
| 28 | Silicone Rubber No. 1 | Aluminum No. 2 | 0.8 | 0.03 | ABA | 1.0 |
| 29 | Silicone Rubber No. 1 | Aluminum No. 2 | 0.8 | 0.03 | ABA | 2.0 |

TABLE 2-continued

| Example Number | Material A | Material B | Material A Thickness (mm) | Material B Thickness (mm) | Multi-layer Structure | Size of Air Gap (cm) |
|---|---|---|---|---|---|---|
| 30 | Silicone Rubber No. 1 | Aluminum No. 2 | 0.8 | 0.03 | ABA | 3.0 |

The referenced descriptions contained in the patents, patent documents, and publications cited herein are incorporated by reference in their entirety as if each were individually incorporated. Various unforeseeable modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only, with the scope of the invention intended to be limited only by the claims set forth herein as follows:

We claim:

1. A sound barrier comprising a phononic crystal comprising a substantially periodic array of structures disposed in a first medium having a first density, said structures being made of a second medium having a second density different from said first density, wherein one of said first and second media is a viscoelastic medium having a speed of propagation of longitudinal sound wave and a speed of propagation of transverse sound wave, said speed of propagation of longitudinal sound wave being at least 30 times said speed of propagation of transverse sound wave, and wherein the other of said first and second media is a viscoelastic or elastic medium.

2. The sound barrier of claim 1, wherein said speed of propagation of longitudinal sound wave is at least 30 times said speed of propagation of transverse sound wave at least in the audible range of acoustic frequencies.

3. The sound barrier of claim 1, wherein said speed of propagation of longitudinal sound wave is at least 50 times said speed of propagation of transverse sound wave.

4. The sound barrier of claim 1, wherein said viscoelastic medium is selected from viscoelastic solids, viscoelastic liquids, and combinations thereof.

5. The sound barrier of claim 4, wherein said viscoelastic solids and viscoelastic liquids have a steady shear plateau modulus of less than or equal to $5\times10^6$ Pa at 20° C.

6. The sound barrier of claim 1, wherein at least one said viscoelastic medium in said sound barrier has a steady shear plateau modulus that is less than or equal to $1\times10^6$ Pa at 20° C.

7. The sound barrier of claim 4, wherein said viscoelastic solids and said viscoelastic liquids are selected from rubbery polymer compositions and combinations thereof.

8. The sound barrier of claim 7, wherein said rubbery polymer compositions are selected from elastomers, elastoviscous liquids, and combinations thereof.

9. The sound barrier of claim 1, wherein said other of said first and second media is an elastic medium.

10. The sound barrier of claim 9, wherein said elastic medium has a speed of propagation of longitudinal sound wave that is at least 2000 meters per second.

11. The sound barrier of claim 9, wherein said elastic medium is an elastic solid selected from metals, metal alloys, glassy polymers, and combinations thereof.

12. The sound barrier of claim 1, wherein said substantially periodic array of structures is a one-dimensional array in the form of a multi-layer structure comprising alternating layers of said first and second media.

13. The sound barrier of claim 12, wherein said multi-layer structure comprises alternating layers of a viscoelastic medium and an elastic medium, said viscoelastic medium being selected from elastomers and combinations thereof, and said elastic medium being selected from metals, metal alloys, glassy polymers, and combinations thereof.

14. The sound barrier of claim 13, wherein said viscoelastic medium is selected from silicone rubbers, (meth)acrylate polymers, block copolymers, cellulosic polymers, blends of organic polymer and polydiorganosiloxane polyamide block copolymer, neoprene, and combinations thereof; and said elastic medium is selected from copper, aluminum, copper alloys, aluminum alloys, and combinations thereof.

15. The sound barrier of claim 12, wherein said multi-layer structure comprises from 3 to 10 alternating layers of a viscoelastic material having a layer thickness of 0.75 mm to 1.25 mm and an elastic material having a layer thickness of 0.025 to 1 mm, said multi-layer structure having dimensions in the range of 1 mm to 10 mm.

16. The sound barrier of claim 15, wherein said multi-layer structure comprises from 3 to 5 alternating layers of said viscoelastic material and said elastic material; said viscoelastic material being selected from silicone rubbers, acrylate polymers, and combinations thereof; said elastic material being selected from aluminum, epoxy resins, aluminum alloys, and combinations thereof; and said multi-layer structure having dimensions in the range of 2 mm to 4 mm.

17. The sound barrier of claim 1, wherein said sound barrier provides a transmission loss that is greater than or equal to 20 dB across the range of 800 Hz to 1500 Hz and has all dimensions less than or equal to 20 cm in size.

18. The sound barrier of claim 12, wherein said sound barrier provides a transmission loss that is greater than or equal to 20 dB across the range of 800 Hz to 1500 Hz and has all dimensions less than or equal to 20 cm in size.

19. A process for preparing a sound barrier comprising a phononic crystal, the process comprising (a) providing a first medium having a first density; (b) providing a second medium having a second density that is different from said first density; and (c) forming a substantially periodic array of structures disposed in said first medium, said structures being made of said second medium; wherein one of said first and second media is a viscoelastic medium having a speed of propagation of longitudinal sound wave and a speed of propagation of transverse sound wave, said speed of propagation of longitudinal sound wave being at least 30 times said speed of propagation of transverse sound wave, and wherein the other of said first and second media is a viscoelastic or elastic medium.

20. A sound insulation process comprising (a) providing a sound barrier comprising a phononic crystal comprising a substantially periodic array of structures disposed in a first medium having a first density, said structures being made of a second medium having a second density different from said first density, wherein one of said first and second media is a viscoelastic medium having a speed of propagation of longitudinal sound wave and a speed of propagation of transverse sound wave, said speed of propagation of longitudinal sound wave being at least 30 times said speed of propagation of transverse sound wave, and wherein the other of said first and second media is a viscoelastic or elastic medium; and (b) interposing said sound barrier between an acoustic source and an acoustic receiver.

* * * * *

UNITED STATES PATENT AND TRADEMARK OFFICE

CERTIFICATE OF CORRECTION

PATENT NO. : 8,132,643 B2
APPLICATION NO. : 12/746967
DATED : March 13, 2012
INVENTOR(S) : Ali Berker It is certified that error appears in the above-identified patent and that said Letters Patent is hereby corrected as shown below:

Title Page, Item (75) Inventors
Line 4, delete “Marie Alsohyna” and insert -- Marie Aloshyna --.

Signed and Sealed this
Seventeenth Day of July, 2012

David J. Kappos
*Director of the United States Patent and Trademark Office*